US008210517B2

(12) United States Patent
Osakabe et al.

(10) Patent No.: US 8,210,517 B2
(45) Date of Patent: Jul. 3, 2012

(54) IMAGE PROCESSING DEVICES AND SHEET FEEDING DEVICES

(75) Inventors: Yoshinori Osakabe, Seto (JP); Satoru Nakakita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 12/341,494

(22) Filed: Dec. 22, 2008

(65) Prior Publication Data

US 2009/0166962 A1 Jul. 2, 2009

(30) Foreign Application Priority Data

Dec. 28, 2007 (JP) ................................. 2007-340874

(51) Int. Cl.
*B65H 83/00* (2006.01)
*B65H 85/00* (2006.01)
(52) U.S. Cl. ..................................... 271/3.18; 271/3.14
(58) Field of Classification Search .......... 271/3.14, 271/3.18, 3.2, 272, 314; 492/18; 399/367
See application file for complete search history.

(56) References Cited

U.S. PATENT DOCUMENTS 4,110,038 A * 8/1978 Irvine et al. ...................... 355/50
4,171,128 A * 10/1979 Irvine et al. ................... 271/3.18
(Continued)

FOREIGN PATENT DOCUMENTS
CN 1041550 A 4/1990
(Continued)

OTHER PUBLICATIONS

The State Intellectual Property Office of the People's Republic of China; Office Action in Chinese Patent Application No. 200810189501.3 (counterpart to the above-captioned US Patent Application) mailed on May 27, 2010.

(Continued)

*Primary Examiner* — Kaitlin Joerger
*Assistant Examiner* — Patrick Cicchino
(74) *Attorney, Agent, or Firm* — Baker Botts L.L.P.

(57) ABSTRACT

An image processing device comprises a first feeding unit and a second feeding unit, wherein the first feeding unit is coupled to the second feeding unit via a sheet feeding path, and is configured to feed a sheet toward the second feeding unit in a sheet feeding direction via the sheet feeding path. The image processing device further comprises an image processing portion, wherein the first feeding unit is disposed in the sheet feeding path upstream of the image processing portion in the sheet feeding direction, and the first feeding unit comprises a first shaft configured to rotate in the sheet feeding direction. The second feeding unit is disposed in the sheet feeding path downstream of the image processing portion in the sheet feeding direction, and the first feeding unit and the second feeding unit are configured to feed and hold the sheet simultaneously. The second feeding unit comprises a second shaft configured to rotate in the feeding direction. The image processing device further comprises a first supporting member which rotatably supports each of a first end of the first shaft and a second end of the first shaft, a second supporting member which rotatably supports each of a first end of the second shaft and a second end of the second shaft, and a third supporting member which rotatably supports at least one of the first shaft and the second shaft at least one predetermined portion which is different than each end of the at least one of the first shaft and the second shaft.

17 Claims, 15 Drawing Sheets

U.S. PATENT DOCUMENTS

| | | | |
|---|---|---|---|
| 4,729,557 A * | 3/1988 | Kiyohara | 271/272 |
| 4,923,139 A | 5/1990 | Bulso, Jr. et al. | |
| 5,110,103 A * | 5/1992 | Miyoshi et al. | 271/3.18 |
| 5,584,473 A * | 12/1996 | Baba | 271/3.18 |
| 5,878,318 A * | 3/1999 | Sako et al. | 399/367 |
| 6,185,405 B1 * | 2/2001 | Sueoka | 399/367 |
| 6,978,991 B2 * | 12/2005 | Stevens et al. | 271/3.2 |
| 7,080,836 B2 * | 7/2006 | Hamada et al. | 271/274 |
| 7,302,222 B2 * | 11/2007 | Ho et al. | 399/367 |
| 7,380,787 B2 * | 6/2008 | Fukumura | 271/264 |
| 7,584,954 B2 | 9/2009 | Nagao | |
| 2004/0212649 A1 | 10/2004 | Ouchi | |
| 2008/0284085 A1 * | 11/2008 | Curina et al. | 271/3.15 |
| 2009/0189328 A1 * | 7/2009 | Ohama et al. | 271/3.14 |

FOREIGN PATENT DOCUMENTS

| | | |
|---|---|---|
| JP | S60-247235 A | 12/1985 |
| JP | H05-155459 A | 6/1993 |
| JP | H09-238236 A | 9/1997 |
| JP | 2001-341911 A | 12/2001 |
| JP | 2003-192174 A | 7/2003 |
| JP | 2007-297191 A | 11/2007 |

OTHER PUBLICATIONS

The State Intellectual Property Office of the People's Republic of China, Notification of the Second Office Action for Chinese Patent Application No. 200810189501.3 (counterpart to above-captioned patent application), issued Mar. 3, 2011.

Japan Patent Office, Notice of Reasons for Rejection for Japanese Patent Application No. 2007-340874 (counterpart to above-captioned patent application), mailed Nov. 29, 2011.

Japan Patent Office, Decision of Final Rejection for Japanese Patent Application No. 2007-340874 (counterpart to above-captioned patent application), mailed May 8, 2012.

* cited by examiner

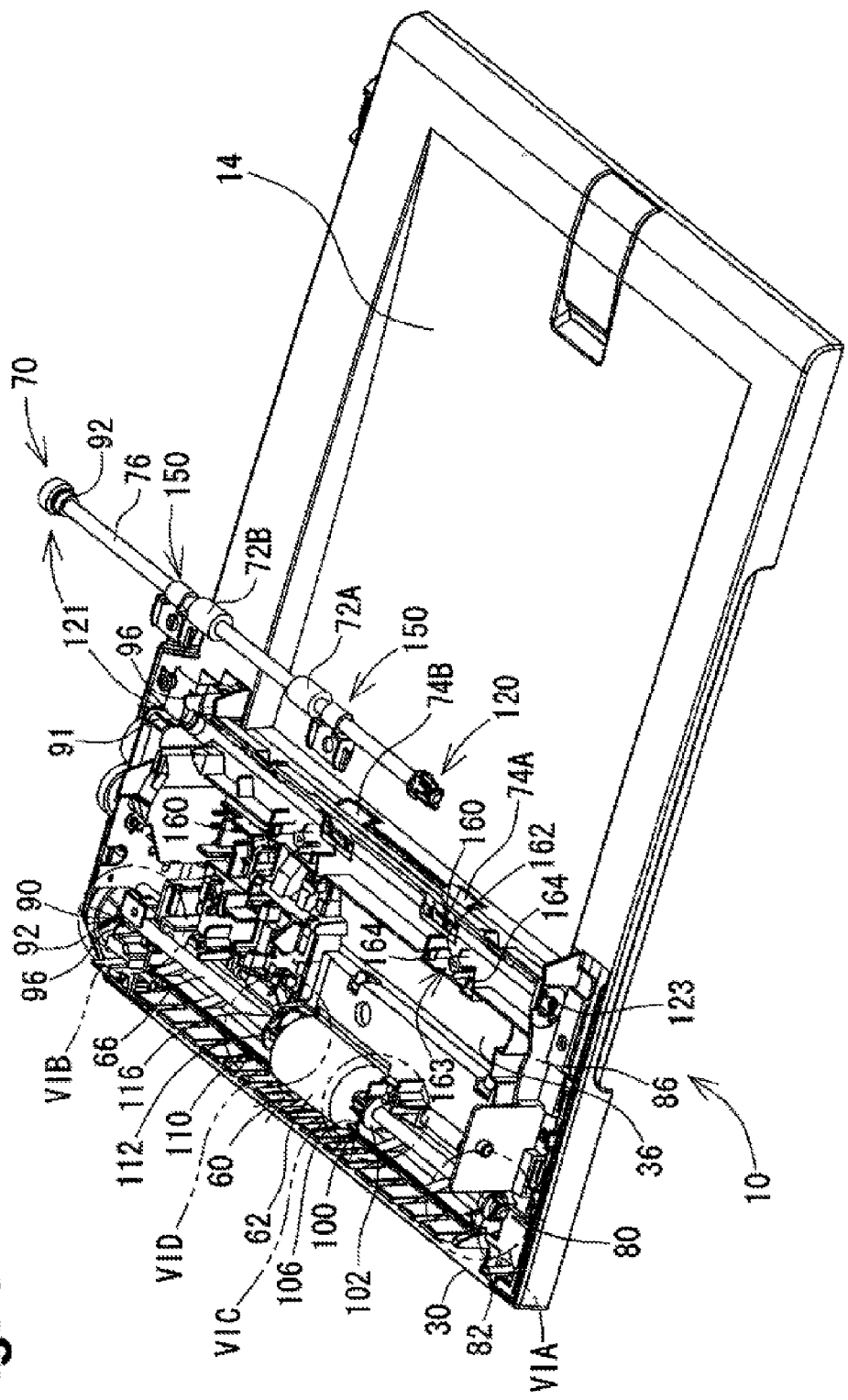

IMAGE PROCESSING DEVICES AND SHEET FEEDING DEVICES

CROSS REFERENCE TO RELATED APPLICATION

The present application claims priority from Japanese Patent Application No. 2007-340874, which was filed on Dec. 28, 2007, the disclosure of which is incorporated herein by reference in its entirety.

BACKGROUND OF THE INVENTION

1. Field of the Invention

The present invention relates to image processing devices comprising a sheet feeding device configured to feed sheets, such as documents and recording mediums, using a plurality of rollers.

2. Description of Related Art

Known scanners, facsimile machines, and copiers, and multifunction devices configured to perform the functions of a scanner, a facsimile machine, and a copier, such as the devices described in U.S. Pat. No. 7,080,836 B2 and Japanese Laid-Open Patent Publication Nos. 9-238236 and 5-155459, include a sheet feeding device that automatically feeds documents stored in a document tray, one by one, to a reading position, or automatically feeds recording mediums held in a sheet cassette to a recording position.

The sheet feeding device includes a plurality of rotating shafts which are configured to rotate and have a predetermined distance therebetween in a feeding direction of a sheet. At least one drive roller is mounted to each rotating shaft. When a motor inputs a rotating force to the rotating shaft, the drive roller rotates with the rotating shaft. A driven roller is pressed against a roller surface of the drive roller. Therefore, the driven roller rotates with the drive roller. When the leading end of a sheet reaches a nip position between the drive roller and the driven roller, the sheet is fed by the drive roller in the feeding direction.

Referring to FIG. 15, a known roller supporting mechanism is depicted. In the known roller supporting mechanism, first drive rollers 201 are disposed upstream of second drive rollers 202 in the feeding direction, as indicated by an outline arrow. A rib 207 is disposed at each end of a feeding path 206 in its width direction. First drive rollers 201 are mounted to a rotating shaft 211. The ends of the rotating shaft 211 are rotatably supported by ribs 207. Second drive rollers 202 are mounted to rotating shaft 212. The ends of the rotating shaft 212 are rotatably supported by ribs 207.

When the leading edge of a sheet 208 reaches first drive rollers 201, first drive rollers 201 feed sheet 208 in the feeding direction. After the leading edge of sheet 208 passes first drive roller 201 and reaches second drive rollers 202, second drive rollers 202 feed sheet 208. After the leading edge of sheet 208 reaches second drive rollers 202 and before the trailing end of sheet 208 passes over first drive rollers 201, both first drive rollers 201 and second drive rollers 202 feed sheet 208. When the circumferential velocity of first drive rollers 201 is greater than the circumferential velocity of second drive rollers 202, sheet 208 flexes between first drive rollers 201 and second drive rollers 202, and may be damaged. Therefore, the circumferential velocity of second drive rollers 202 disposed on the downstream side in the feeding direction is adjusted to be slightly greater than the circumferential velocity of first drive rollers 201. Accordingly, a first feeding force with which first drive rollers 201 feed sheet 208 is greater than a second feeding force with which second drive rollers 202 feed sheet 208, such that sheet 208 is held under tension between first drive rollers 201 and second drive rollers 202.

The known sheet feeding device only supports rotating shafts 211 and 212 at their ends. Consequently, the difference between the circumferential velocity of first drive rollers 201 and the circumferential velocity of second drive rollers 202 causes a tensile force. The tensile force pulls sheet 208 while generating a frictional force which draws rotating shafts 211 and 212 closer to each other. The frictional force causes rotating shafts 211 and 212 to flex toward each other, as indicated by dotted lines in FIG. 15. After the trailing end of sheet 208 passes over first drive rollers 201, flexed rotating shafts 211 and 212 return to their original positions. At this time, sheet 208 moves in the feeding direction by an amount corresponding to an amount that flexed rotating shaft 212 of second drive rollers 202 moves from its original position when shaft 212 flexes. As a result, a feeding failure occurs and places the document out of position with respect to the feeding direction. When a feeding failure occurs during the process of reading an image recorded on sheet 208 or during the process of recording an image on sheet 208, read image data or recorded sheet 208 will have streaks. Thus, the accuracy of reading an image or recording an image is reduced.

When sheet 208 is stopped intermittently while being fed by first drive rollers 201 and second drive rollers 202, a feeding failure occurs due to various factors, such as non-uniform friction forces applied to first drive rollers 201 and second drive rollers 202 when the sheet feeding is temporarily stopped and resumed, non-uniform amounts of flexing of rotating shafts 211 and 212 at the timing of stopping and resuming of the sheet feeding, or non-uniform flexing amounts of an elastic member, such as rubber, at the time of stopping and resuming of the sheet feeding if an elastic member is disposed or applied on a surface of drive rollers 201 and 202. Such feeding failure causes streaks in the read image data or in an image recorded on a sheet 208. Thus, the accuracy of reading an image or recording an image is reduced.

The above problems occur on small-diameter rotating shafts used to reduce the weight of the sheet feeding devices. The problems also occur on image reading devices having auto document feeders (ADF) that feed large-sized documents, such as A3 size, or on inkjet-type image recording apparatuses configured to record an image on large-size recording sheets, such as size A3, because the amount of flexing of rotating shafts 211 and 212 increases in these devices.

SUMMARY OF THE INVENTION

Therefore, a need has arisen for image processing devices and sheet feeding devices which overcome these and other shortcomings of the related art. A technical advantage of the present invention is that feeding failures caused by differences in circumferential velocity of the rollers are reduced, which increases the quality of image processing.

According to an embodiment of the present invention, an image processing device comprises a first feeding unit, a second feeding unit, and an image processing portion. The first feeding unit is coupled to the second feeding unit via a sheet feeding path, and is configured to feed a sheet toward the second feeding unit in a sheet feeding direction via the sheet feeding path. The first feeding unit is disposed in the sheet feeding path upstream of the image processing portion in the sheet feeding direction, and the first feeding unit comprises a first shaft configured to rotate in the sheet feeding direction, a first drive roller coupled to the first shaft, and a first pressing member configured to apply a force to the first drive roller. The second feeding unit is disposed in the sheet feeding path downstream of the image processing portion in the sheet feeding direction, and the first feeding unit and the second feeding unit are configured to feed and hold the sheet simultaneously. The second feeding unit comprises a second shaft configured to rotate in the feeding direction, a second drive roller coupled to the second shaft, and a second pressing member configured to apply a force to the second drive roller. The image processing device further comprises a first supporting member which rotatably supports each of a first end of the first shaft and a second end of the first shaft, a second supporting member which rotatably supports each of a first end of the second shaft and a second end of the second shaft, and a third supporting member which rotatably supports at least one of the first shaft and the second shaft, at at least one predetermined portion which is different than each end of the at least one of the first shaft and the second shaft.

According to another embodiment of the present invention, a sheet feeding device comprises a first feeding unit, a second feeding unit and a reference member. The first feeding unit is coupled to the second feeding unit via a sheet feeding path, and is configured to feed a sheet toward the second feeding unit in a sheet feeding direction via the sheet feeding path. The reference member comprises a reference surface which the sheet contacts during image processing. The first feeding unit is disposed in the sheet feeding path upstream of the reference member in the sheet feeding direction, and the first feeding unit comprises a first shaft configured to rotate in the sheet feeding direction, a first drive roller coupled to the first shaft, and a first pressing member configured to apply a force to the first drive roller. The second feeding unit is disposed in the sheet feeding path downstream of the reference member in the sheet feeding direction, and the first feeding unit and the second feeding unit are configured to feed and hold the sheet simultaneously. The second feeding unit comprises a second shaft configured to rotate in the feeding direction, a second drive roller coupled to the second shaft, and a second pressing member configured to apply a force to the second drive roller. The image feeding device further comprises a first supporting member which rotatably supports each of a first end of the first shaft and a second end of the first shaft, a second supporting member which rotatably supports each of a first end of the second shaft and a second end of the second shaft, and a third supporting member which rotatably supports at least one of the first shaft and the second shaft, at least one predetermined portion which is different than each end of the at least one of the first shaft and the second shaft.

Other objects, features, and advantages of embodiments of the present invention will be apparent to persons of ordinary skill in the art from the following description of preferred embodiments with reference to the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

FIG. 5 is a perspective view of the ADF with the ADF cover and an output unit removed.

DETAILED DESCRIPTION OF EMBODIMENTS OF THE INVENTION

Figure 1:
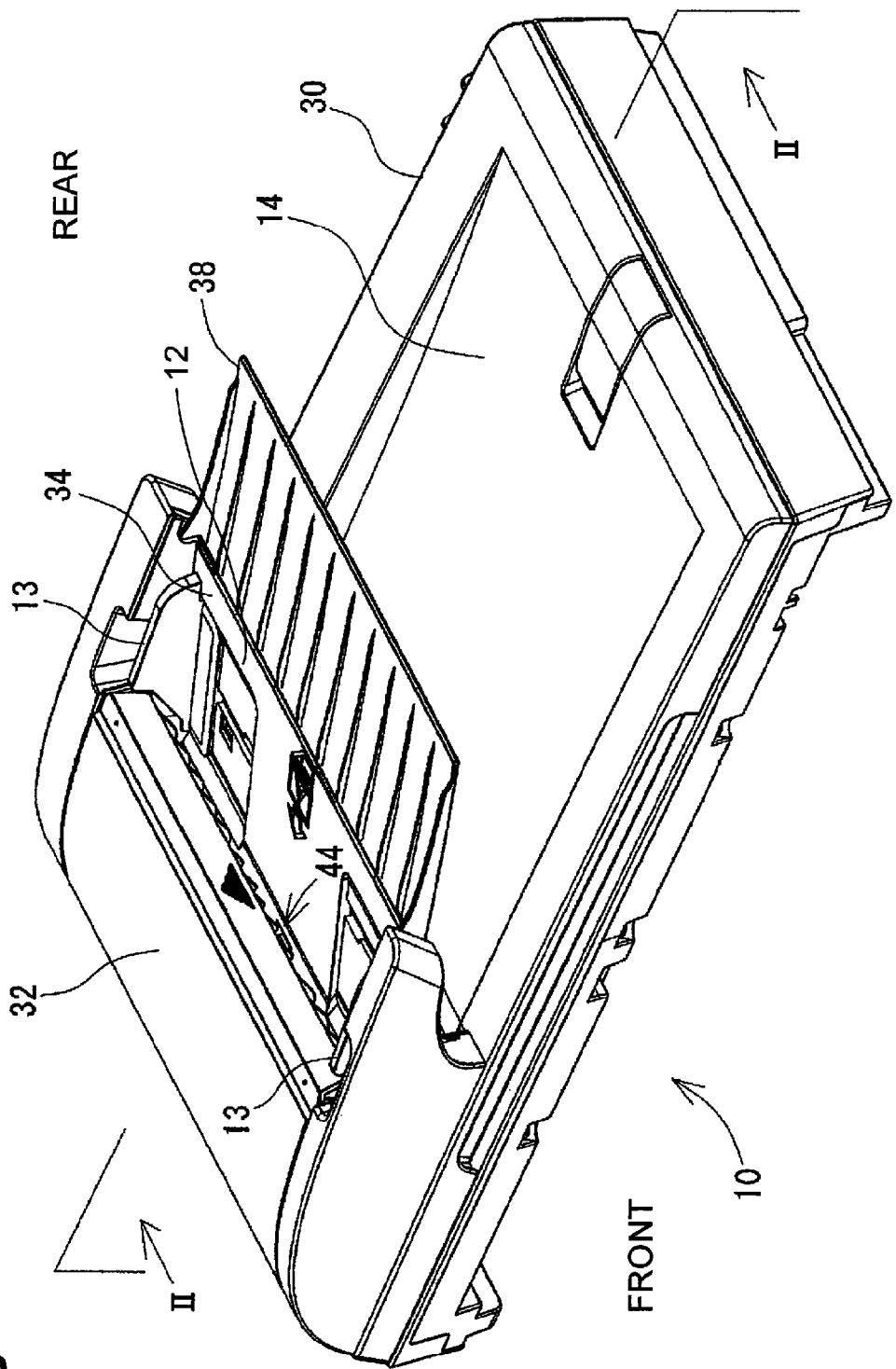
FIG. 1 is a perspective view of an auto document feeder (ADF), according to an embodiment of the invention.

Embodiments of the present invention and their features and technical advantages may be understood by referring to FIGS. 1-14, like reference numerals being used for like corresponding portions in the various drawings.

Figure 2:
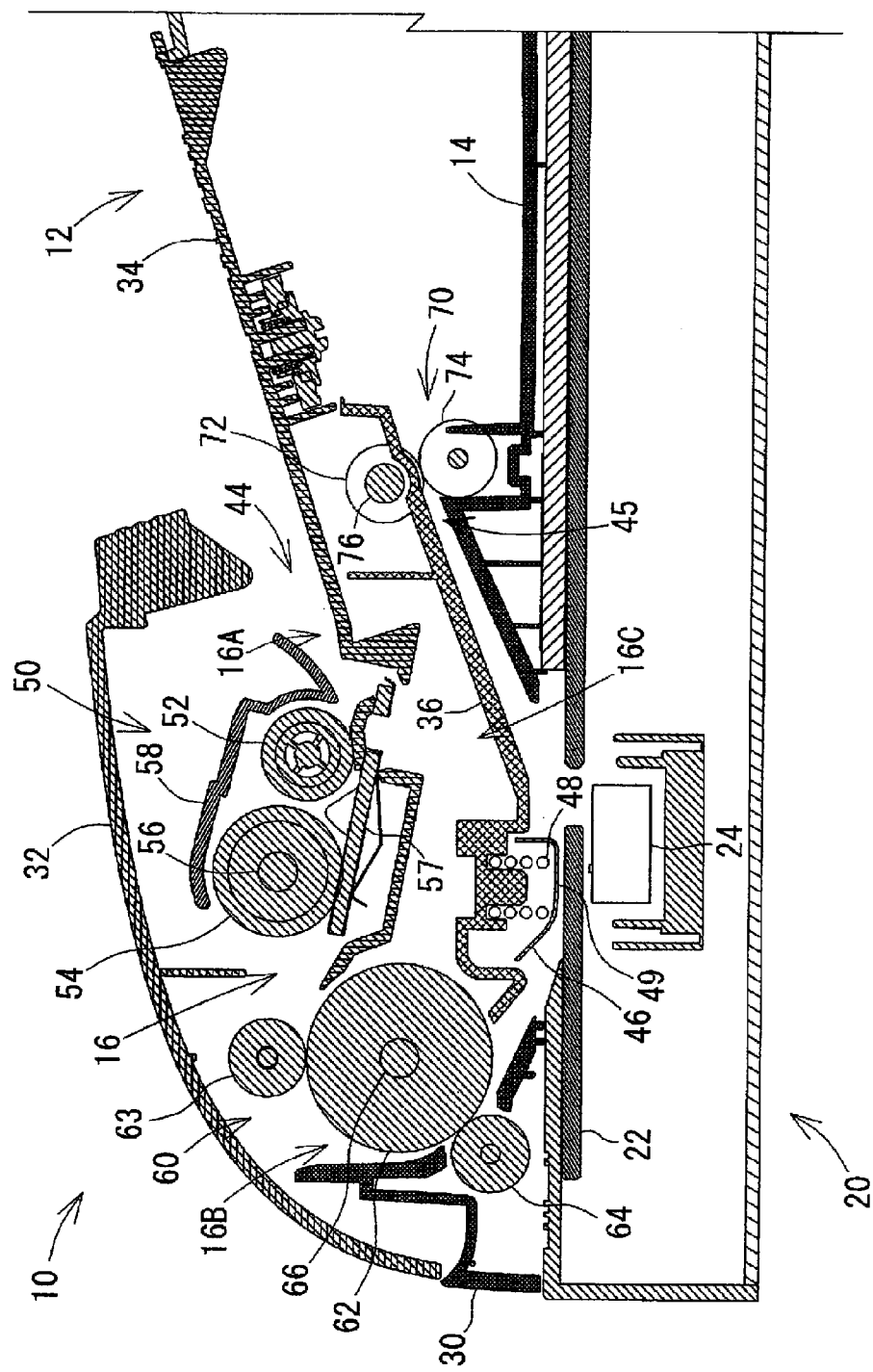
FIG. 2 is a cross-sectional view of the ADF of FIG. 1, taken along the line II-II of FIG. 1.

An automatic document feeder (ADF) 10 may be configured to feed sheets, e.g., documents and recording mediums, along a feeding path 16. Referring to FIG. 1, ADF 10 may comprise a document tray 12 for loading documents and an output tray 14 for outputting documents. Referring to FIG. 2, an interior of ADF 10 may comprise feeding path 16. ADF 10 automatically and continuously may feed documents in a feeding direction from document tray 12 to output tray 14 via feeding path 16. ADF 10 may be disposed on an image processing device 20, e.g., an image reading device.

Image processing device 20 may comprise a contact glass 22 disposed at an upper portion of image processing device 20 and an image processing portion 24, e.g., an image sensor. Image processing portion 24 may comprise a contact image sensor (CIS) or a charge coupled device (CCD). The CIS or the CCD may be disposed below contact glass 22. ADF 10 may cover the upper surface of image processing device 20. When a document fed by ADF 10 passes over an image reading position on contact glass 22, image processing portion 24 may read an image on the surface of the document. Image reading device 20 may be coupled to ADF 10. ADF 10 may be configured to work with any image processing device, e.g., an image recording device configured to record an image on recording mediums, such as paper sheets, by applying an image recording agent, such as toner or ink, to the recording mediums. ADF 10 also may be configured to work with sheet feeding devices which feed recording mediums to an image recording position in the image recording devices.

Document tray 12 and output tray 14 may be stacked generally in a vertical direction. More specifically, document tray 12 may be disposed above output tray 14. Document tray 12 may comprise an upper guide 34 and an extension tray 38. Output tray 14 may be formed in a recessing upper surface of ADF 10. Output tray 14 may be disposed above or below document tray 12.

Referring to FIG. 2, feeding path 16 may have substantially a "U" shape when viewed in a vertical cross section. Feeding path 16 may connect document tray 12 to output tray 14. Feeding path 16 may comprise an upper feeding portion 16A, a curved feeding portion 16B, and a lower feeding portion 16C. As shown in FIG. 2, upper feeding portion 16A may extend leftward from document tray 12, curved feeding portion 16B may curve downward from upper feeding portion 16A, and lower feeding portion 16C may extend rightward from curved feeding portion 16B toward output tray 14. In another embodiment, feeding path 16 may be substantially a straight line.

A case of ADF 10 may comprise a main frame 30, an ADF cover 32, upper guide 34, and a lower guide 36. The case of ADF 10 may comprise synthetic resin, e.g., acrylonitrile butadiene styrene (ABS), polypropylene, or polyacetal, and may be formed by injection molding. ADF cover 32, upper guide 34 and lower guide 36 may be attached to main frame 30.

Upper guide 34 and lower guide 36 may be disposed in a stacked manner in the vertical direction. Lower guide 36 may be attached to main frame 30 to define lower feeding portion 16C. Lower feeding portion 16C may comprise a passage formed between an upper surface of main frame 30 and a lower surface of lower guide 36 allowing a document to pass therethrough. Lower guide 36 may function as a guide surface of lower feeding portion 16C. Upper guide 34 may be attached to an upper portion of lower guide 36. As shown in FIG. 2, ADF cover 32 may be pivotally supported by main frame 30 about a left end portion thereof, and may be configured to pivotally open and close. When ADF cover 32 is closed, ADF cover 32 covers a portion of ADF 10 from the left end portion of main frame 30 to a portion of upper guide 34. When ADF cover 32 is closed, a rear surface of ADF cover 32 and an upper surface of upper guide 34 may define upper feeding portion 16A with a passage allowing a document to pass therethrough. As such, upper guide 34 may function as a guide surface of upper feeding portion 16A.

A portion of upper guide 34 may extend outward from upper feeding portion 16A. Extension tray 38 may be attached to an upstream end of upper guide 34 in the feeding direction. Extension tray 38 may be supported by upper guide 34, and may fold over upper guide 34.

A feeding roller 62 may be disposed on the downstream side of upper guide 34 and the upstream side of lower guide 36 in the feeding direction. Feeding roller 62 may be rotatably supported by main frame 30. Feeding roller 62 and main frame 30 may define curved feeding portion 16B with a passage allowing a document to pass therethrough.

A stack of documents may be loaded on document tray 12, and the leading ends of the documents may be inserted into a chute 44. Chute 44 may be disposed on the most upstream side of upper feeding portion 16A in the feeding direction. Surfaces of documents containing images to be read may face upward on document tray 12. When ADF 10 feeds documents from document tray 12 through curved feeding portion 16B of feeding path 16, the documents may be turned upside down with the surface of the documents containing images to be read facing down. Then, the documents may be fed to lower feeding portion 16C, and may be outputted to and stacked on output tray 14 with the surfaces of the documents containing images that were read facing down.

Referring to FIG. 2, lower guide 36 may comprise a reference member 46 which presses documents against contact glass 22 when the documents are fed through lower feeding portion 16C. Reference member 46 may be disposed at a position corresponding to an image reading position at which image processing portion 24 reads a surface of a document containing images to be read. More specifically, reference member 46 may be attached to a lower surface of lower guide 36. Reference member 46 may be movably supported in the vertically direction. A spring 48 may be disposed between the lower surface of lower guide 36 and reference member 46, such that reference member 46 is elastically urged downward by spring 48. Thus, reference member 46 may extend toward lower feeding portion 16C.

When the leading end of a document reaches reference member 46, the leading end may enter a space between reference member 46 and contact glass 22. At this time, a reference surface 49 of reference member 46, e.g., a lower surface, may contact a lower surface of a document. Therefore, even when a wrinkled document is fed to reference member 46, the document may be held between the lower surface of reference member 46 and contact glass 22, such that the wrinkled document is flattened.

Referring to FIG. 1, document tray 12 may comprise a pair of document guides 13 spaced apart in a depth direction of ADF 10. Document guides 13 may be slidable in the depth direction of ADF 10. Document guides 13 may align the position of documents, which are loaded onto document tray 12, in their lateral direction. When one of document guides 13 moves in one direction, the other document guide 13 may move in the opposite direction by an interlocking mechanism. Therefore, when documents are loaded onto document tray 12, document guides 13 may align the center of the documents in their lateral direction with the center of document tray 12 in its lateral direction.

A feeding mechanism configured to feed documents may be disposed in feeding path 16. More specifically, the feeding mechanism may comprise a supply unit 50, a first feeding unit 60, and a second feeding unit 70. Supply unit 50, first feeding unit 60 and second feeding unit 70 may sequentially be arranged in the feeding direction.

Figure 3:
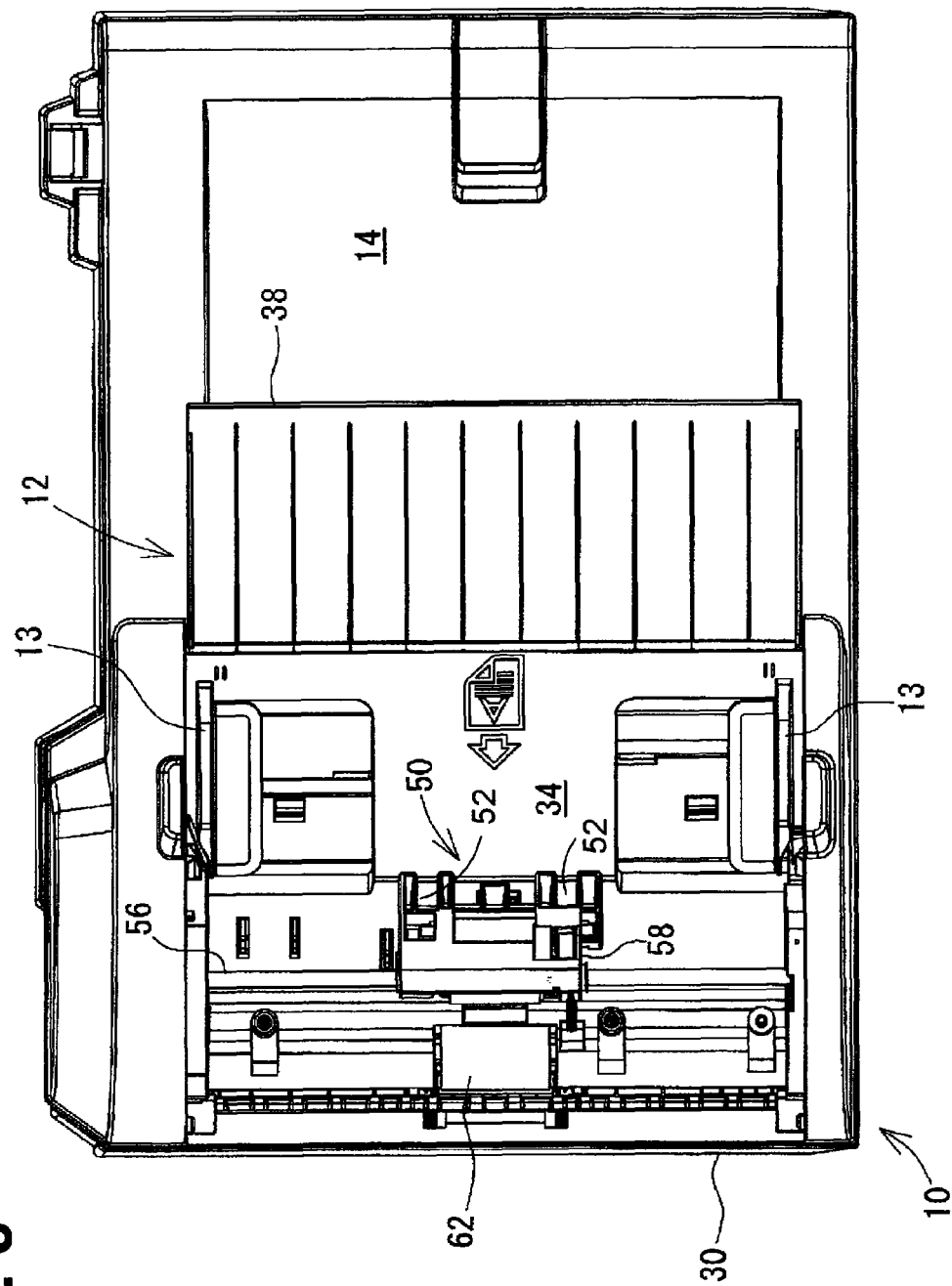
FIG. 3 is a plan view of the ADF with an ADF cover removed.

Referring to FIGS. 2 and 3, supply unit 50 may be disposed in upper feeding portion 16A. Specifically, supply unit 50 may be disposed at chute 44 located on the most upstream side of upper feeding portion 16A in the feeding direction. Supply unit 50 may comprise a pickup roller 52, a separation roller 54 and a shaft 56. Shaft 56 may be rotatably supported at each of its ends by main frame 30. Separation roller 54 may be fixedly mounted at a middle portion of shaft 56 in its axial direction. A motor (not shown) may transmit a rotational force to shaft 56 in a predetermined direction, e.g., a clockwise direction in FIG. 2. When shaft 56 rotates, separation roller 54 may rotate in the same direction as shaft 56. In this embodiment, separation roller 54 may rotate at a circumferential velocity V1.

An arm 58 may be rotatably disposed on shaft 56. Arm 58 may comprise two bearings (not shown). Each bearing may be supported by shaft 56 at an end of separation roller 54 in an axial direction. Arm 58 may extend from shaft 56 toward the upstream end of the feeding direction. Pickup rollers 52 may be rotatably disposed at an upstream end of arm 58. The motor may transmit a rotational force to arm 58 to rotate arm 58 on shaft 56.

Transmission gears (not shown) may be assembled with arm 58. The transmission gears may transmit a rotational force from shaft 56 to pickup rollers 52. When shaft 56 rotates, both separation roller 54 and pickup rollers 52 may rotate in the same direction as shaft 56. Pickup rollers 52 and separation roller 54 may have the same diameter and may rotate at the same circumferential velocity.

A separation pad 57 may be disposed opposite separation roller 54. Separation pad 57 may be in contact with a roller surface of separation roller 54 to separate documents, one by one, by friction. When shaft 56 rotates, documents may be separated, one by one, by separation pad 57, and then may be fed to feeding path 16.

Figure 4:
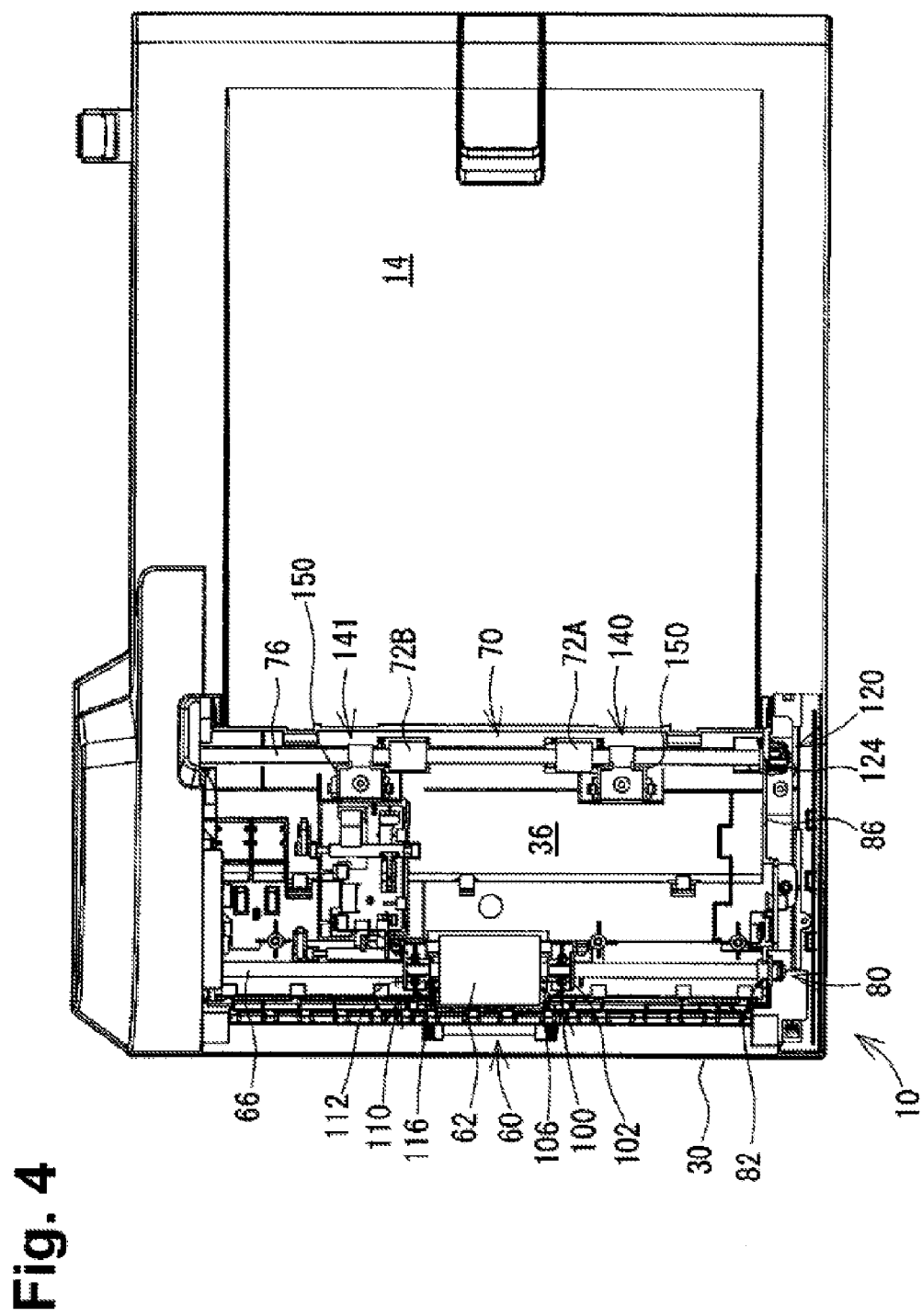
FIG. 4 is a plan view of the ADF and an upper guide with the ADF cover removed.

Referring to FIG. 2, feeding unit 60 may be disposed in curved feeding portion 16B. Feeding unit 60 may be disposed in feeding path 16 upstream of reference member 46 in the feeding direction. Feeding unit 60 may comprise a first drive roller 62, first pressing rollers 63 and 64, and a first shaft 66. First shaft 66 may comprise steel, e.g., stainless steel, aluminum alloy, or synthetic resin. Referring to FIGS. 4 and 5, first shaft 66 may be rotatably supported at its ends by first supporting members, e.g., supporting mechanisms 80 and 90, at main frame 30. First shaft 66 also may be supported at portions other than its ends in the direction along feeding path 16 by third supporting members, e.g., supporting mechanisms 100 and 110.

Referring to FIGS. 4 and 5, feeding roller 62 may be fixedly mounted to a middle portion of first shaft 66. A roller surface of feeding roller 62 may comprise an elastic member, e.g., a sponge or a rubber, to improve a tackiness of the roller surface to a document when feeding roller 62 contacts a document. The motor (not shown) may transmit a rotational force to first shaft 66 in a rotational direction, e.g., a counterclockwise direction in FIG. 2, to feed a document in the feeding direction. When shaft 66 rotates, feeding roller 62 may rotate in the same rotational direction as shaft 66. In this embodiment, feeding roller 62 may rotate at a second circumferential velocity V2, which may be greater than the circumferential velocity V1 of separation roller 54.

Referring to FIG. 2, pinch roller 63 may be disposed opposite and above feeding roller 62. Pinch roller 63 may press against the roller surface of feeding roller 62. Pinch roller 63 may be rotatably supported by a rib disposed at an underside of ADF cover 32. A shaft of pinch roller 63 may be elastically urged by an elastic member, e.g., a spring. When ADF cover 32 is open, pinch roller 63 may become separated from feeding roller 62. When ADF cover 32 is closed, pinch roller 63 may press against the roller surface of feeding roller 62, as shown in FIG. 2.

Pinch roller 64 may be disposed opposite and below feeding roller 62. Pinch roller 64 may be disposed downstream of pinch roller 63 in the feeding direction. Pinch roller 64 may be rotatably supported by a rib disposed at an underside of main frame 30. A shaft of pinch roller 64 may be elastically urged by an elastic member, e.g., a spring. Thus, pinch roller 64 may press against the roller surface of feeding roller 62.

When feeding roller 62 rotates with pinch rollers 63 and 64 pressing against feeding roller 62, pinch rollers 63 and 64 also may rotate. When the leading end of a document fed in the feeding direction by supply unit 50 reaches a nip position between feeding roller 62 and pinch roller 63 or a nip position between feeding roller 62 and pinch roller 64, the document may be fed by the rotational force of feeding roller 62 in the feeding direction while being held between feeding roller 62 and pinch roller 63 or between feeding roller 62 and pinch roller 64. The document simultaneously may be fed by separation roller 54 and feeding roller 62. As described above, the circumferential velocity V2 of feeding roller 62 may be greater than the circumferential velocity V1 of separation roller 54. Therefore, when a document simultaneously is fed by separation roller 54 and feeding roller 62, a tensile force may be applied to the document in the direction along the feeding direction.

In an embodiment, pinch rollers 63 and 64 may press against feeding roller 62 at positions above and below feeding roller 62. Nevertheless, the number and the positions of rollers 62, 63, and 64 may vary. For example, a plurality of feeding rollers 62 may be concentrically disposed along the depth direction of ADF 10. A member, such as separation pad 57, instead of a roller shape member, e.g., pinch rollers 63 and 64, may be disposed in contact with feeding roller 62.

Figure 6A:
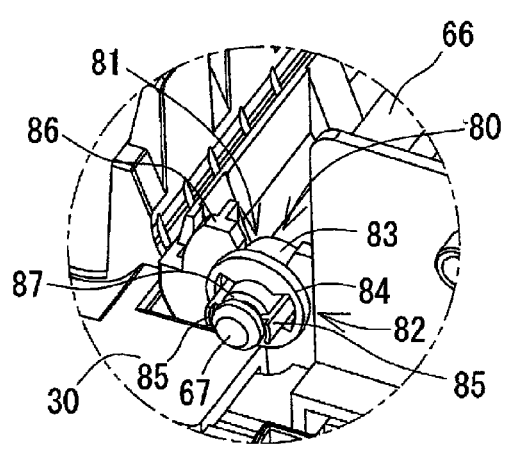
FIG. 6A is an enlarged view of a portion VIA of FIG. 5.
Figure 6B:
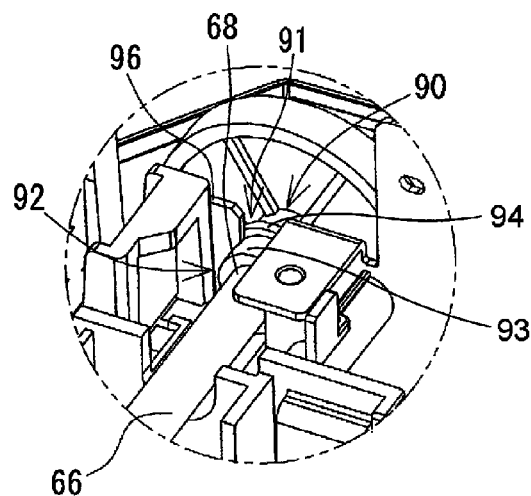
FIG. 6B is an enlarged view of a portion VIB of FIG. 5.
Figure 6C:
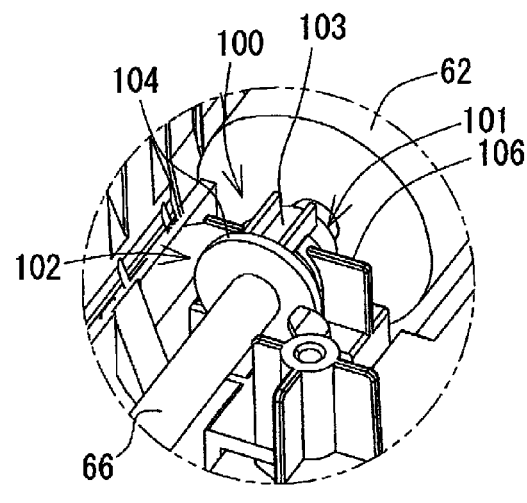
FIG. 6C is an enlarged view of a portion VIC of FIG. 5.
Figure 6D:
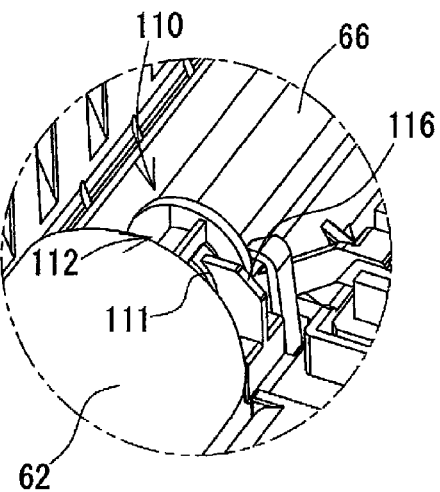
FIG. 6D is an enlarged view of a portion VID of FIG. 5.

Referring to FIGS. 5-6D, first shaft 66 may be supported at its ends by supporting mechanisms 80 and 90. First shaft 66 also may be supported at portions adjacent to the edge of feeding roller 62 in its axial direction by supporting mechanisms 100 and 110. More specifically, supporting mechanisms 80 and 90 may support a front end 67 and a rear end 68, respectively, of shaft 66. Supporting mechanisms 100 and 110 may support first shaft 66 at positions adjacent to a front end and a rear end, respectively, of feeding roller 62 in its axial direction.

Referring to FIG. 6A, supporting mechanism 80 may comprise a supporting groove 81 and a bush 82. Supporting groove 81 may be formed on a rib 86 extending from main frame 30. More specifically, supporting groove 81 may be formed by removing a portion of rib 86 from its upper side toward its lower side. Bush 82 may be coupled to supporting groove 81. Bush 82 may comprise a synthetic resin, such as polyacetal (POM), which has higher slidability than rib 86. Bush 82 may comprise a cylindrical, tubular body 83 and a flange 84. Front end 67 of shaft 66 may have a groove 87 formed on a periphery thereof. When front end 67 is inserted into the hole of tubular body 83, a hook 85 disposed on bush 82 may engage groove 87. Thus, front end 67 may be rotatably coupled to bush 82, and tubular body 83 may be coupled to supporting groove 81. As such, front end 67 of first shaft 66 may be rotatably supported by supporting mechanism 80.

Referring to FIG. 6B, supporting mechanism 90 may comprise a supporting groove 91 formed on a rib 96, and a bush 92 coupled to supporting groove 91. Bush 92 may comprise a cylindrical, tubular body 93 and a flange 94. Tubular body 93 may be coupled to supporting groove 91. Rear end 68 of shaft 66 may be inserted into the hole of tubular body 93. Thus, rear end 68 of shaft 66 may be rotatably supported by supporting mechanism 90. Rib 96 may comprise a conductive metal, and bush 92 may comprise a conductive resin. Therefore, static electricity generated on shaft 66 may dissipate from the case of ADF 10 via bush 92 and rib 96.

Referring to FIG. 6C, supporting mechanism 100 may comprise a supporting groove 101 and a bush 102. Supporting groove 101 may be formed on a rib 106 which extends from main frame 30. More specifically, supporting groove 101 may be formed by removing a portion of rib 106 from its upper side toward its lower side. Bush 102 may be coupled to supporting groove 101. Bush 102 may comprise a synthetic resin, such as polyacetal (POM), which has higher slidability than rib 106. Bush 102 may comprise a cylindrical, tubular body 103 and a flange 104. First shaft 66 may be inserted into the hole of tubular body 103. Bush 102 may be coupled to first shaft 66 at a position adjacent to the frond end face of feeding roller 62 in its axial direction. When bush 102 is coupled to first shaft 66, tubular body 103 may be coupled to supporting groove 101. Thus, first shaft 66 may be rotatably supported by supporting mechanism 100. Flange 104 may function as a stopper to prevent bush 102 from separating from first shaft 66.

Referring to FIG. 6D, supporting mechanism 110 may comprise a supporting groove 111 formed on a rib 116, and a bush 112 coupled to supporting groove 111. Supporting mechanism 110 may be substantially similar to supporting mechanism 100.

Referring to FIG. 2, output unit 70 may be disposed in lower feeding portion 16C. An output chute 45 may be disposed at the most downstream side of feeding path 16 in the feeding direction. Output unit 70 may be disposed in feeding path 16 downstream of reference member 46 in the feeding direction. Output unit 70 may comprise a second drive roller, e.g., an output roller 72, a second pressing member, e.g., a pinch roller 74, and a second shaft, e.g., a shaft 76. Shaft 76 may comprise steel, e.g., stainless steel, aluminum alloy, or synthetic resin. Referring to FIGS. 4 and 5, shaft 76 may be rotatably supported at its ends by second supporting members, e.g., supporting mechanism 120 and 121, located at lower guide 36. Shaft 76 also may be supported at portions other than its ends by third supporting members, e.g., supporting mechanism 140 and 141

Referring to FIGS. 4 and 5, output rollers 72A and 72B may be concentrically mounted to shaft 76. Output rollers 72A and 72B may be disposed on the front side and rear side, respectively, of ADF 10. Roller surfaces of output rollers 72A and 72B may comprise an elastic member, e.g., a sponge or a rubber, to improve a tackiness of the roller surfaces to a document when feed output rollers 72A and 72B contact a document. There may be a predetermined distance between output rollers 72A and 72B. The motor may transmit a rotational force to shaft 76 in a rotational direction, e.g., a counterclockwise direction in FIG. 2, to feed a document in the feeding direction. When shaft 76 rotates, output rollers 72A and 72B may rotate in the same rotational direction as shaft 76. In an embodiment, output rollers 72A and 72B may rotate at a third circumferential velocity V3, which may be greater than the circumferential velocity V2 of feeding roller 62.

Referring to FIG. 2, pinch roller 74 may be disposed below output roller 72. Pinch rollers 74A and 74B may be disposed below output rollers 72A and 72B, respectively. Output roller 72A and 72B may contact the roller surfaces of output rollers 72A and 72B, respectively. Each pinch roller 74A and 74B may be rotatably supported by main frame 30. Shafts of pinch rollers 74A and 74B may be elastically urged by an urging member, e.g., a spring. Thus, pinch rollers 74A and 74B may press against the roller surfaces of output rollers 72A and 72B.

When output roller 72 rotates with pinch roller 74 pressed against output roller 72, pinch roller 74 may rotate. When the leading end of the document fed by feeding roller 62 reaches a nip position between output roller 72 and pinch roller 74, the document may be fed by the rotational force of output roller 72 in the feeding direction while being held by output roller 72 and pinch roller 74. The document may be simultaneously fed by feeding roller 62 and output roller 72. As described above, the circumferential velocity V3 of output roller 72 may be greater than the circumferential velocity V2 of feeding roller 62. Therefore, when a document is fed both by feeding roller 62 and output roller 72, a tensile force may be applied to the document in the direction along the feeding direction.

In an embodiment, two output rollers 72A and 72B may be fixed to shaft 76, however, the number and the positions of output rollers 72A and 72B may vary.

Figure 7:
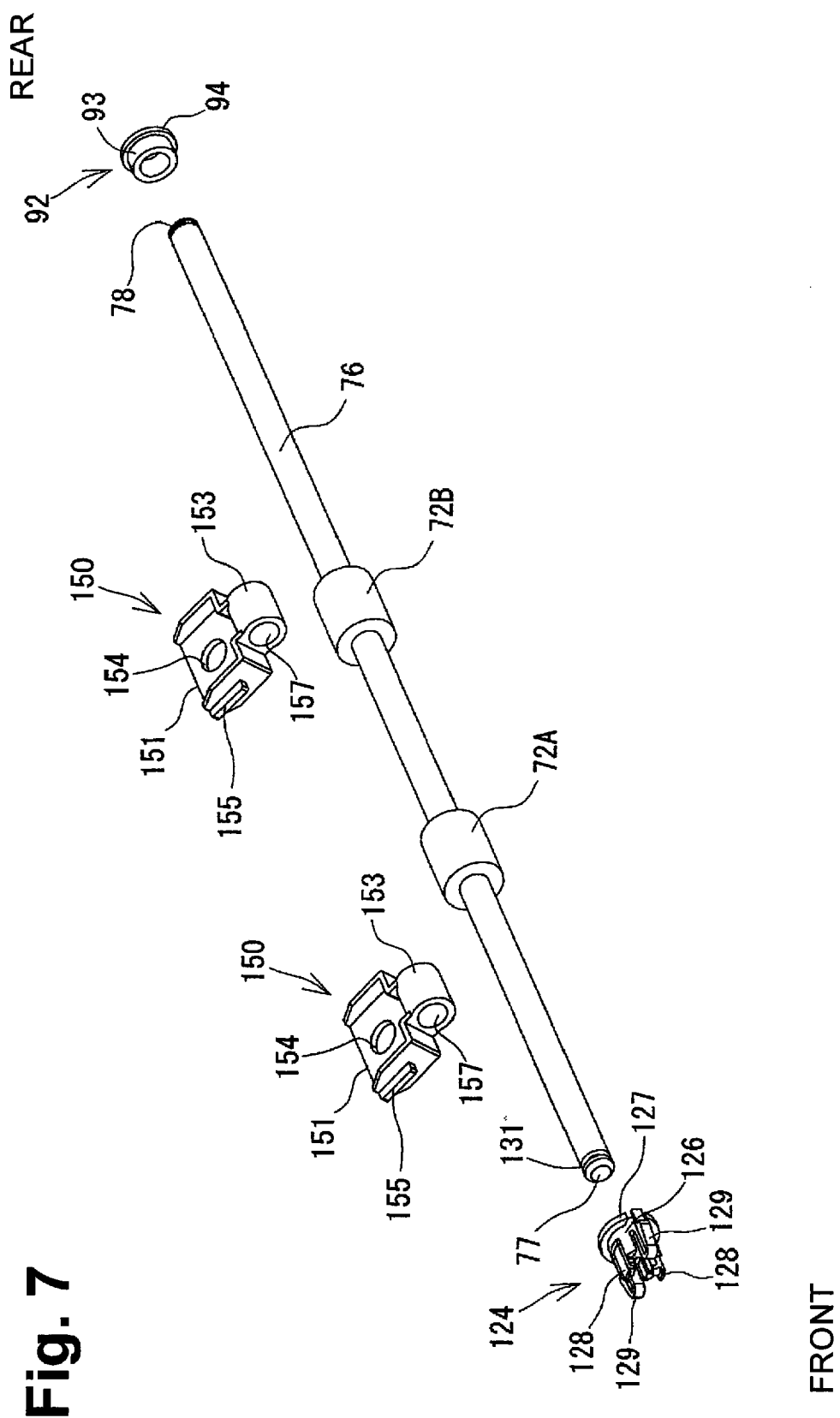
FIG. 7 is a perspective view of the output unit.
Figure 8:
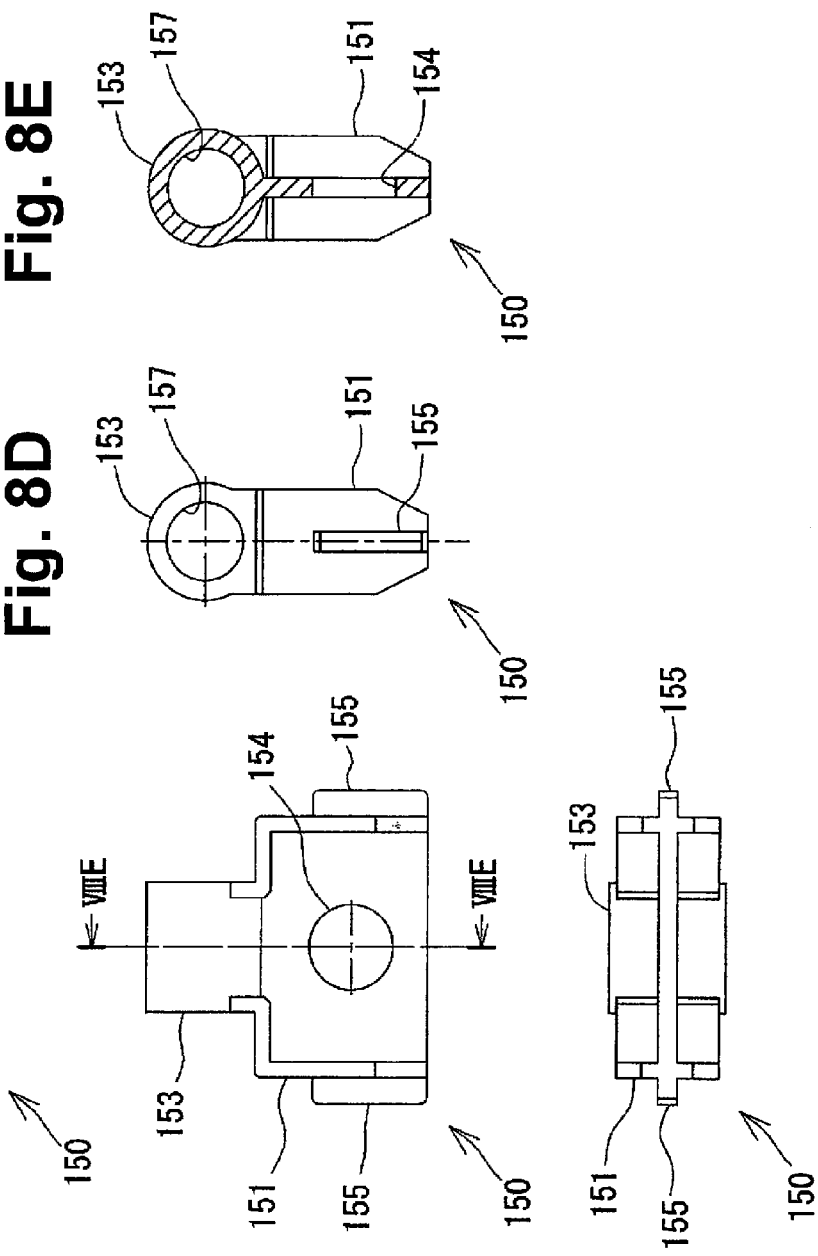
FIG. 8A is a top view of a bearing of the ADF.
FIG. 8B is a front view of the bearing of the ADF.
FIG. 8C is a rear view of the bearing of the ADF.
FIG. 8D is a side view of the bearing of the ADF.
FIG. 8E is a cross-sectional view of the bearing, taken along line VIIIE-VIIIE of FIG. 8A.

Referring to FIGS. 4, 5, and 7, a front end 77 and a rear end 78 of shaft 76 may be supported by supporting mechanisms 120 and 121. Portions of shaft 76 adjacent to a front end of output roller 72A and a rear end of output roller 72B may be supported by supporting mechanisms 140 and 141, respectively. Supporting mechanism 121 may be substantially similar to supporting mechanism 90.

Supporting mechanism 120 may comprise a shaft hole 123, as shown in FIG. 5, and a bush 124, as shown in FIG. 7. Shaft hole 123 may be formed on the rib 86 which extends from lower guide 36. Bush 124 may be coupled to shaft hole 123. Bush 124 may comprise a synthetic resin, such as polyacetal (POM), which has higher slidability than rib 86. Referring to FIG. 7, bush 124 may comprise a cylindrical, tubular body 126, hooks 128, elastically-deformable engagement portions 129, and a flange 127.

End 77 of shaft 76A may have a groove 131 formed on its periphery. When end 77 is inserted into the hole of tubular body 126, hooks 128 may engage groove 131. Thus, bush 124 may be rotatably coupled to end 77. Tubular body 126 may be inserted into shaft hole 123. When tubular body 126 is being inserted into shaft hole 123, engagement portions 129 may be pressed by the inner peripheral surface of shaft hole 123 and may flex toward an outer peripheral surface of tubular body 126. When tubular body 126 is further inserted into shaft hole 123 at a position where flange 127 contacts rib 86, flexed engagement portions 129 may return to their original positions to engage the periphery of shaft hole 123. Thus, bush 124 may be coupled to rib 86. End 77 may be rotatably supported by supporting mechanism 120.

Referring to FIGS. 4 and 5, supporting mechanism 140 may comprise a bearing 150 and an attachment portion 160. Bearing 150 may be attached to attachment portion 160. Supporting mechanism 141 may be substantially similar to supporting mechanism 140.

Attachment portion 160 may be formed on the upper surface of lower guide 36. Attachment portion 160 may comprise a recess 163 having a rectangular shape, a boss 162 to which a screw may be fastened, and two hooks 164 configured to secure bearing 150. As shown in FIG. 7, recess 163 may accommodate a fixing portion 151 of bearing 150. Boss 162 and hooks 164 may extend from the bottom surface of recess 163.

Referring to FIGS. 8A-8E, bearing 150 may comprise fixing portion 151 which may be attached to attachment portion 160 and a contact portion, e.g., a supporting portion 153, which contacts the periphery of shaft 76 to rotatably support shaft 76. Bearing 150 may comprise a synthetic resin, such as polyacetal (POM), that has higher slidability than lower guide 36.

Supporting portion 153 may have a tubular shape and a hole 157 formed therethrough, and a shaft 76 may be inserted through hole 157. When shaft 76 is inserted into hole 157, an inner surface of hole 157 may slide against an outer peripheral surface of shaft 76. With shaft 76 inserted into hole 157, fixing portion 151 may be attached to attachment portion 160. Fixing portion 151 may have a generally rectangular shape. When fixing portion 151 is mounted to attachment portion 160, fixing portion 151 may extend from supporting portion 153 in feeding path 16 along feeding path 16 toward the upstream side of the feeding direction.

Each side face of fixing portion 151 may comprise a protrusion 155. Each protrusion 155 may extend along feeding path 16. Hooks 164 of attachment portion 160 may engage with respective protrusions 155. Protrusions 155 may increase the rigidity of fixing portion 151 along the feeding direction. Protrusions 155 may be disposed at positions corresponding to the positions of hooks 164. Fixing portion 151 may have a hole 154 formed in a middle portion thereof. When fixing portion 151 is accommodated in attachment portion 160, hole 154 may be positioned over boss 162 and hooks 164 may engage respective protrusions 155. Thus, fixing portion 151 may be tentatively fixed to attachment portion 160 while a screw is fastened to boss 162 to permanently secure fixing portion 151 to attachment portion 160.

Referring to FIG. 4, supporting mechanism 140 may be disposed at the upstream end of shaft 76 in the feeding direction. More specifically, with fixing portion 151 fixed to attachment portion 160, shaft 76 may be supported by supporting portion 153 at a position downstream of fixing portion 151 in the feeding direction.

Ends 77 and 78 of shaft 76 may be supported by supporting mechanisms 120 and 121. Portions of shaft 76 adjacent to output roller 72 may be supported by supporting mechanisms 140 and 141.

Figure 9:
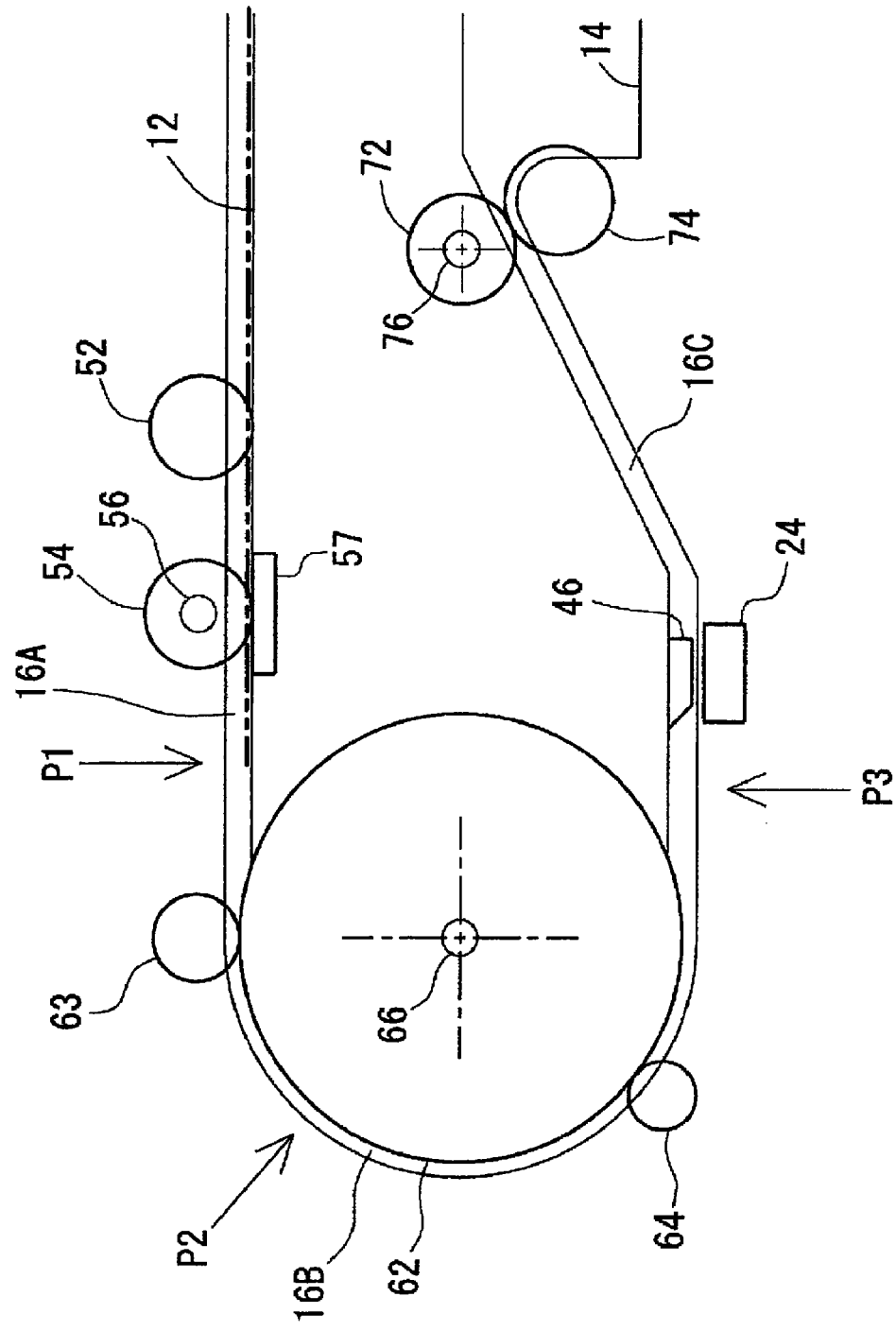
FIG. 9 is a schematic showing tensile forces applied to a document at an instance of document feeding operation.

Referring to FIG. 9, a document loaded on document tray 12 may be fed in the feeding direction by separation roller 54. When the leading end of the document, shown by dotted lines, reaches a point P1 between separation roller 54 and pinch roller 63, a tensile force may not be applied in the feeding direction to the document, however, a compression force may be applied to the document by rollers, e.g., separation roller 54, feeding roller 62, and output roller 72, in the vertical direction.

Figure 10:
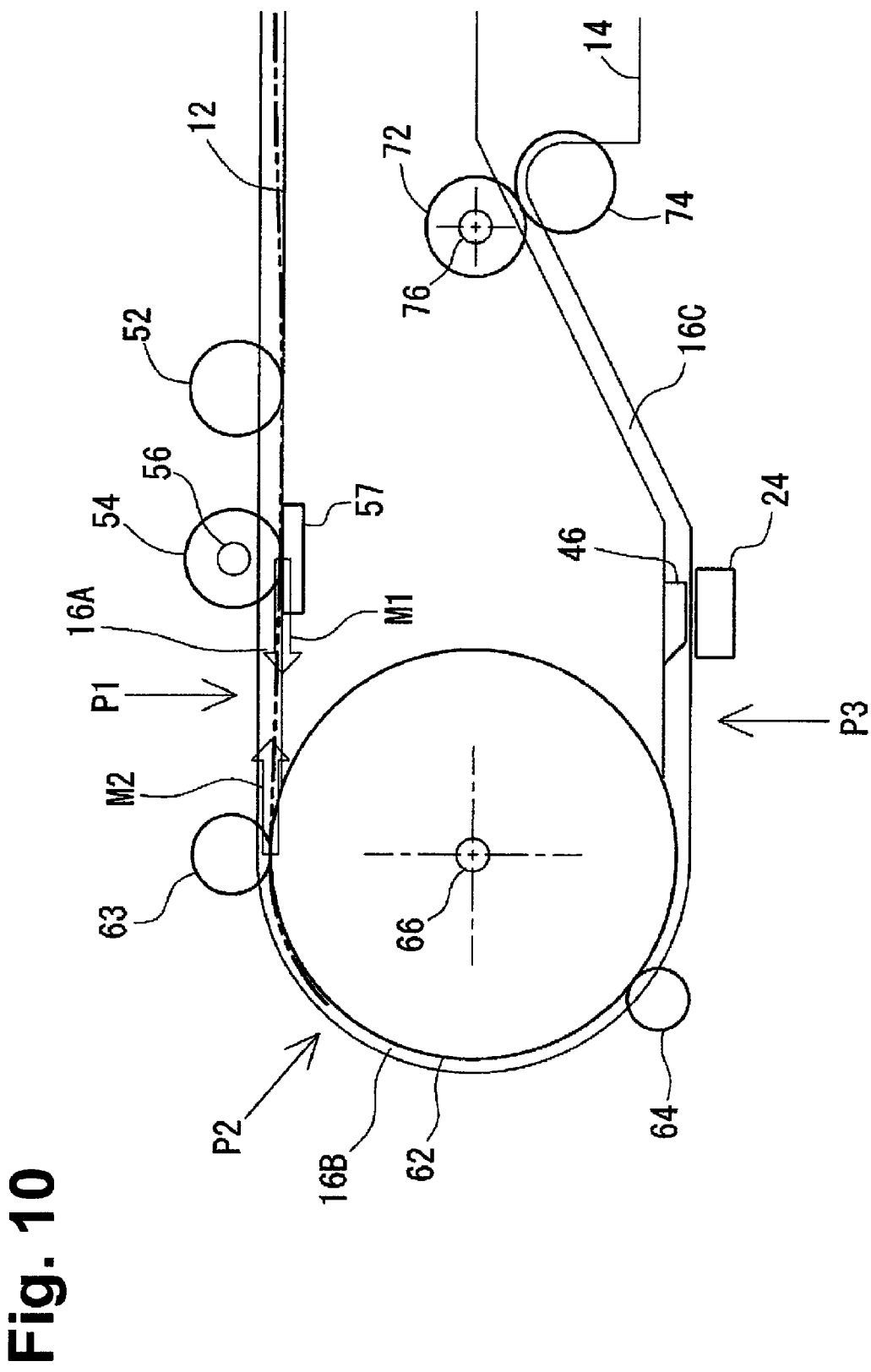
FIG. 10 is a schematic showing tensile forces applied to the document at another instance of document feeding operation

Referring to FIG. 10, when the leading end of the document reaches a point P2 between pinch rollers 63 and 64, the document may be fed while being held between separation roller 54 and separation pad 57 and between feeding roller 62 and pinch roller 63. Thus, the document may be fed by both separation roller 54 and feeding roller 62. The circumferential velocity V2 of feeding roller 62 may be greater than the circumferential velocity V1 of separation roller 54. Therefore, the document may receive a tensile force and may be pulled along the feeding direction. A frictional force M1 in the feeding direction may be generated between the document and separation roller 54 at the nip position between separation roller 54 and separation pad 57. A friction force M2 in a direction opposite to the feeding direction may be generated between the document and feeding roller 62 at the nip position between feeding roller 62 and pinch roller 63. Frictional forces M1 and M2 may act in opposite directions to draw shaft 56 of separation roller 54 and shaft 66 of feeding roller 66 closer to each other.

Figure 11:
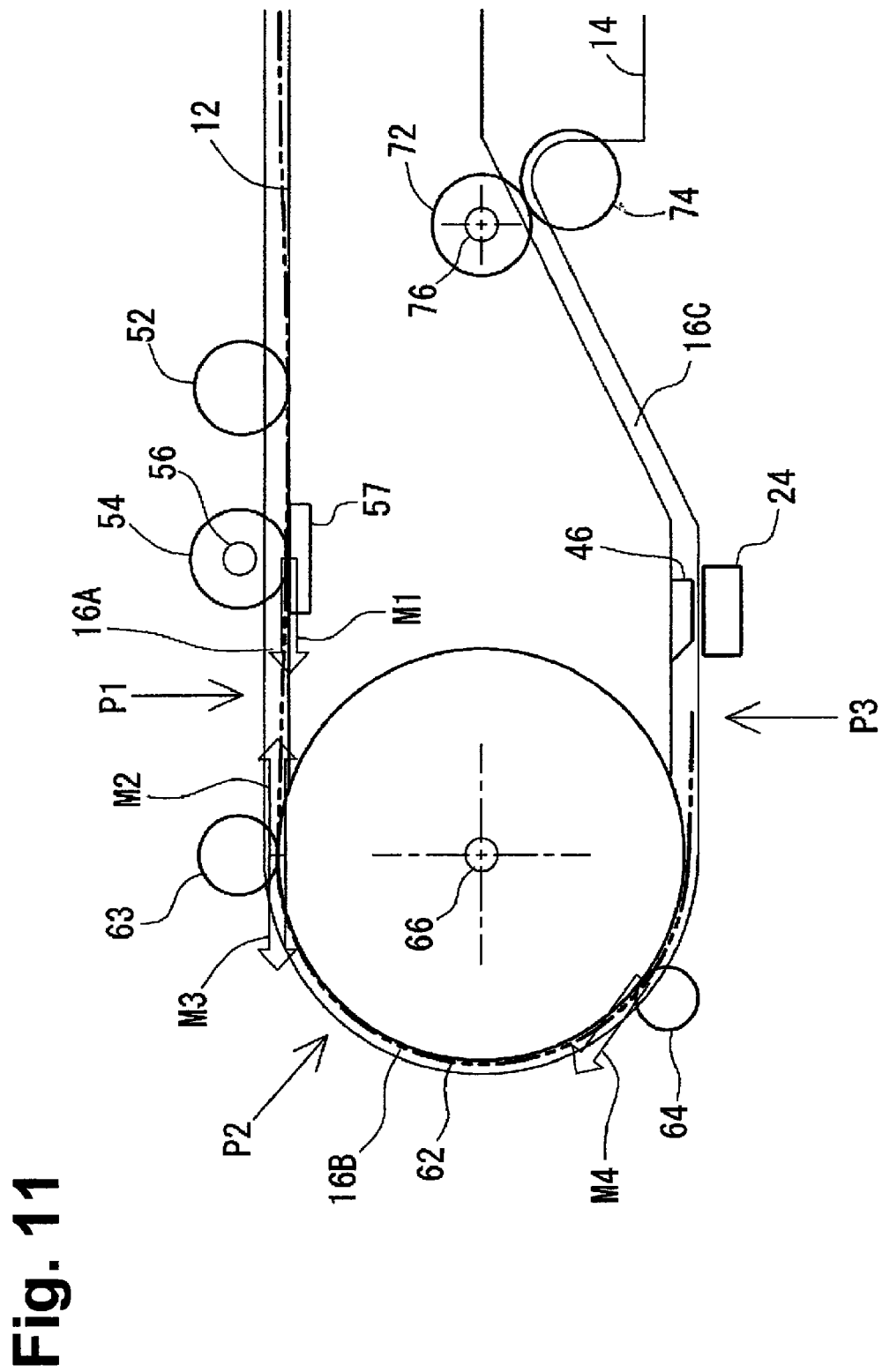
FIG. 11 is a schematic showing tensile forces applied to the document at yet another instance of document feeding operation

Referring to FIG. 11, when the leading end of the document reaches a point P3 between pinch roller 64 and output roller 72, the document may be fed while being held between separation roller 54 and separation pad 57, between feeding roller 62 and pinch roller 63, and between feeding roller 62 and pinch roller 64. Thus, the document may be fed by supply unit 50 and feeding unit 60. At this time, a frictional force M3 in the feeding direction may be generated between the document and feeding roller 62 at the nip position between feeding roller 62 and pinch roller 63. A magnitude of frictional force M3 may be the same as a magnitude of frictional force M2, and a direction of frictional force M3 may be opposite the direction of frictional force M2. Therefore, frictional forces M2 and M3 may cancel each other out at the nip position between feeding roller 62 and pinch roller 63.

Further, a frictional force M4 in the direction opposite to the feeding direction may be generated between the document and feeding roller 62 at the nip position between feeding roller 62 and pinch roller 64. In an embodiment, only frictional force M4 may be generated at the nip position between feeding roller 62 and pinch roller 64 until the document held by output unit 70 passes the reading position of image processing portion 24. Shaft 66 may be supported at each end thereof by supporting mechanisms 80 and 90 and at two portions of shaft 66 by supporting mechanisms 100 and 110. Therefore, even when frictional force M4 is generated, shaft 66 may not flex. Consequently, even when feeding of the document is temporarily stopped during document feeding, a quality of image reading may not be reduced.

Figure 12:
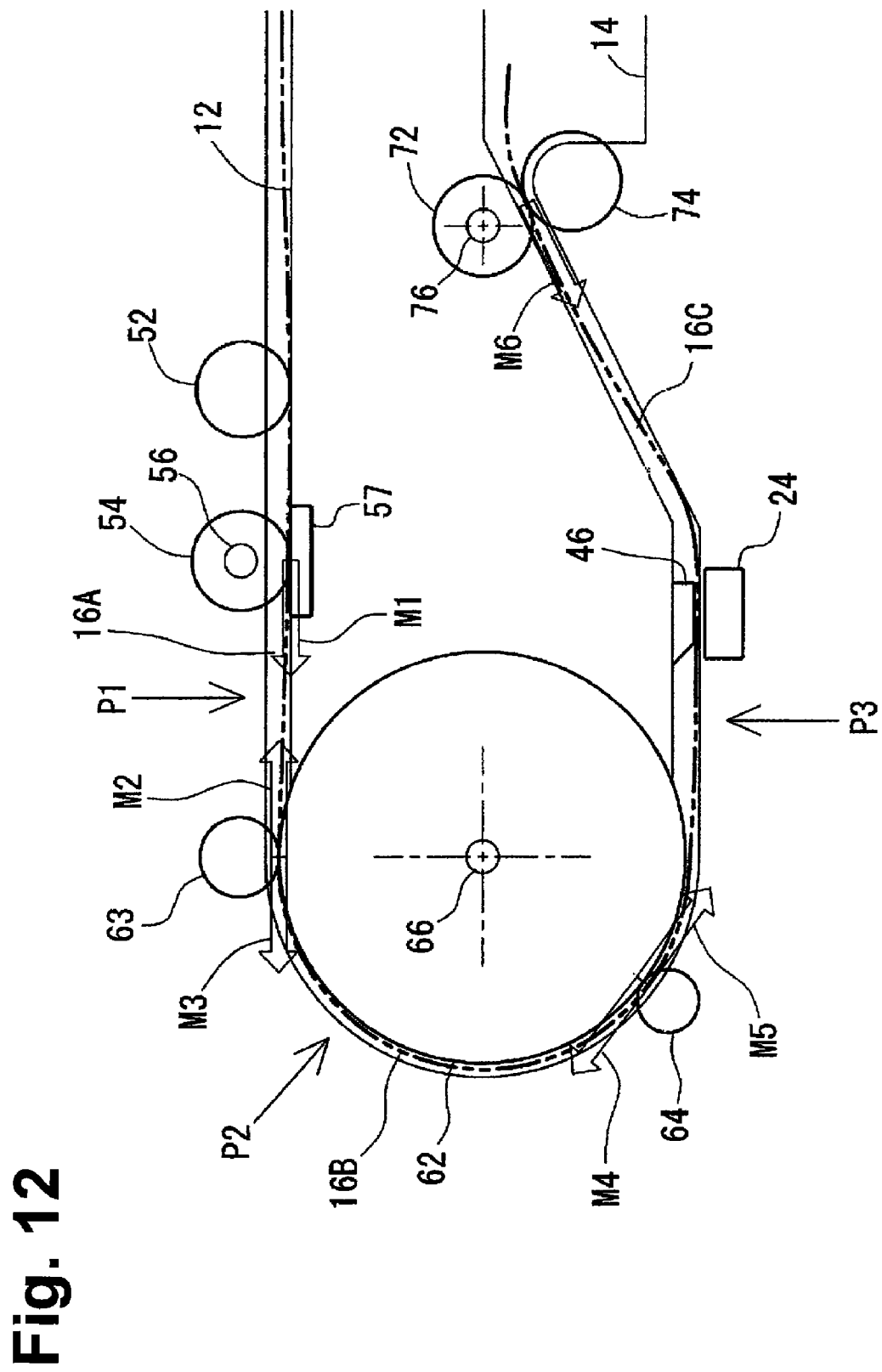
FIG. 12 is a schematic showing tensile forces applied to the document at a further instance of document feeding operation

Referring to FIG. 12, when the leading end of the document reaches output tray 14, the document may be fed while being held between separation roller 54 and separation pad 57, between feeding roller 62 and pinch roller 63, between feeding roller 62 and pinch roller 64, and between output roller 72 and pinch roller 74. Thus, the document may be fed by supply unit 50, feeding unit 60, and output unit 70. At this time, a frictional force M5 in the feeding direction may be generated between the document and feeding roller 62 at the nip position between feeding roller 62 and pinch roller 64. Frictional force M5 may have the same magnitude as frictional force M4, and a direction of frictional force M5 may be opposite to the direction of frictional force M4. Therefore, frictional forces M4 and M5 may cancel each other out at the nip position between feeding roller 62 and pinch roller 64.

Figure 13:
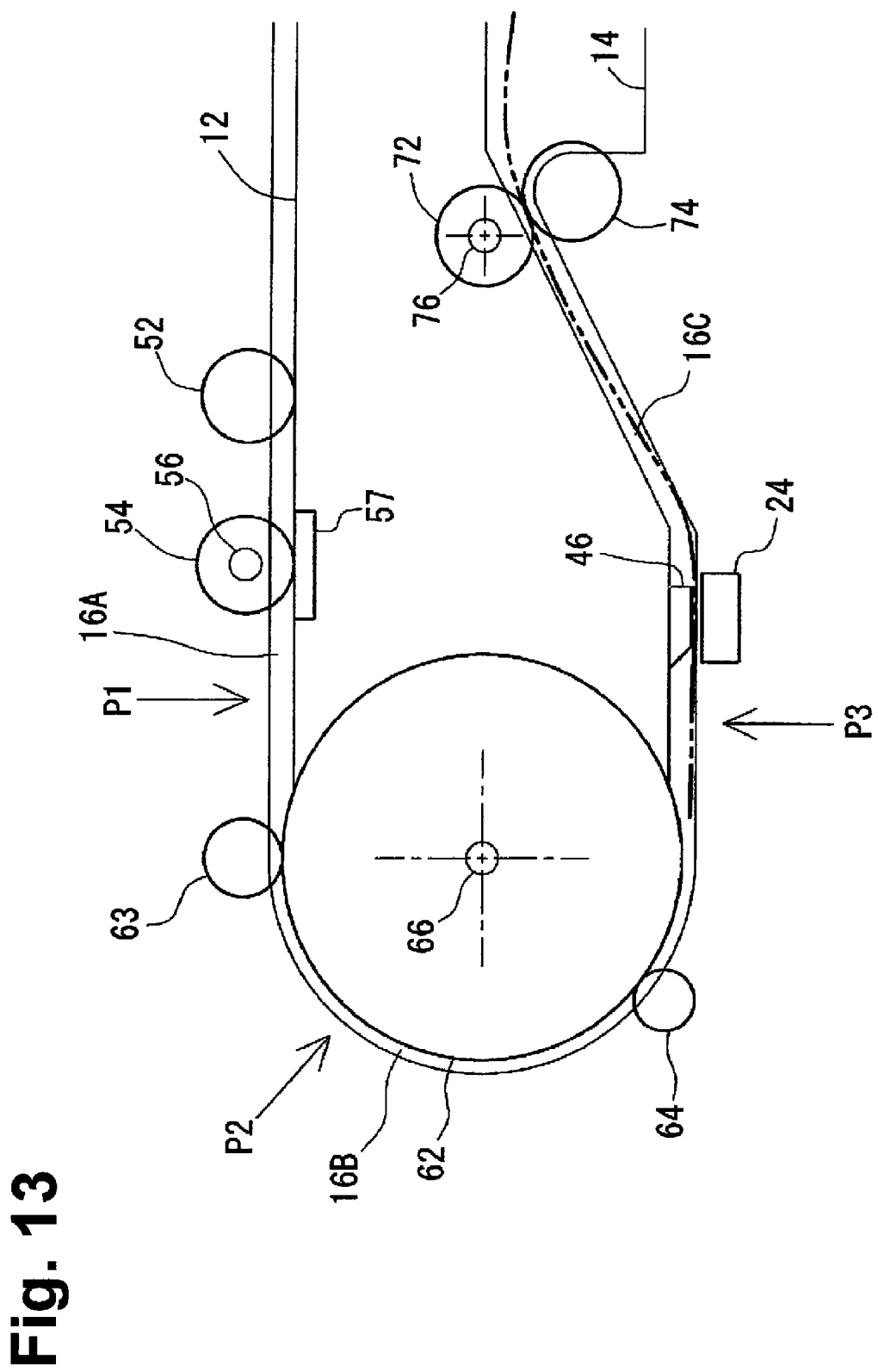
FIG. 13 is a schematic showing tensile forces applied to the document at yet a further instance of document feeding operation.

A frictional force M6 in the direction opposite to the feeding direction may be generated between the document and output roller 72 at the nip position between output roller 72 and pinch roller 74. As shown in FIG. 13, frictional force M6 constantly may be applied in the same direction at the nip position between output roller 72 and pinch roller 74 until the trailing end of the document passes through the nip position between feeding roller 62 and pinch roller 64. Shaft 76 may be supported at its ends by supporting mechanisms 120 and 121 and at two portions thereof by supporting mechanisms 140 and 141. Therefore, even when frictional force M6 is generated, shaft 76 may not flex. Consequently, even when the trailing end of the document passes through the nip position between feeding roller 62 and pinch roller 64, a quality of image reading may not be reduced.

As described above, each supporting mechanism 140 and 141 may comprise bearing 150 and attachment portion 160. Fixing portion 151 of bearing 150 may extend along feeding path 16. Fixing portion 151 may be attached to attachment portion 160. Bearing 150 securely may be mounted to attachment portion 160. Therefore, external forces applied to shaft 76 may not flex shaft 76 because fixing portion 151 securely is mounted to attachment portion 160. Thus, flexing of shaft 76 reliably may be reduced.

Figure 14:
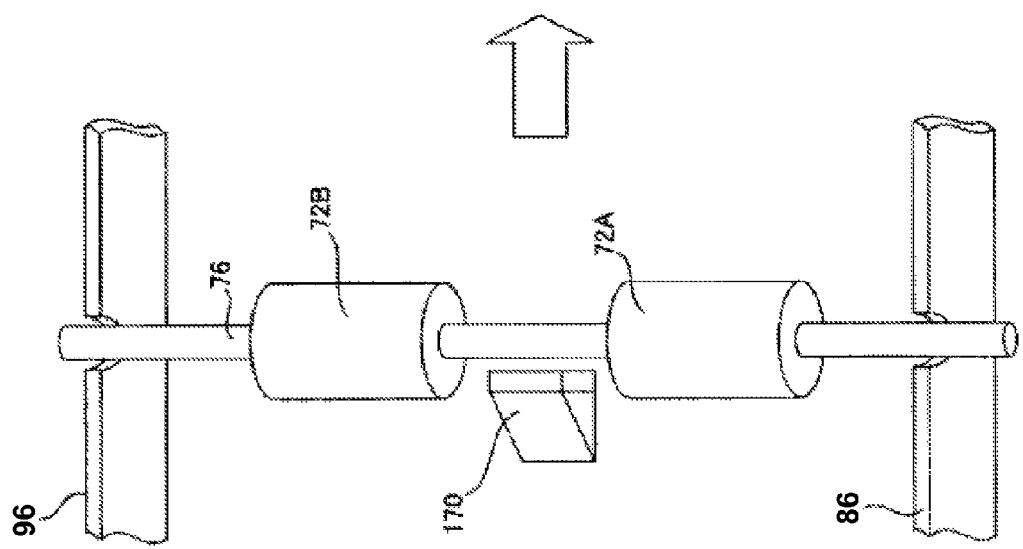
FIG. 14 is a schematic of a third supporting member according to an embodiment of the invention.
Figure 15:
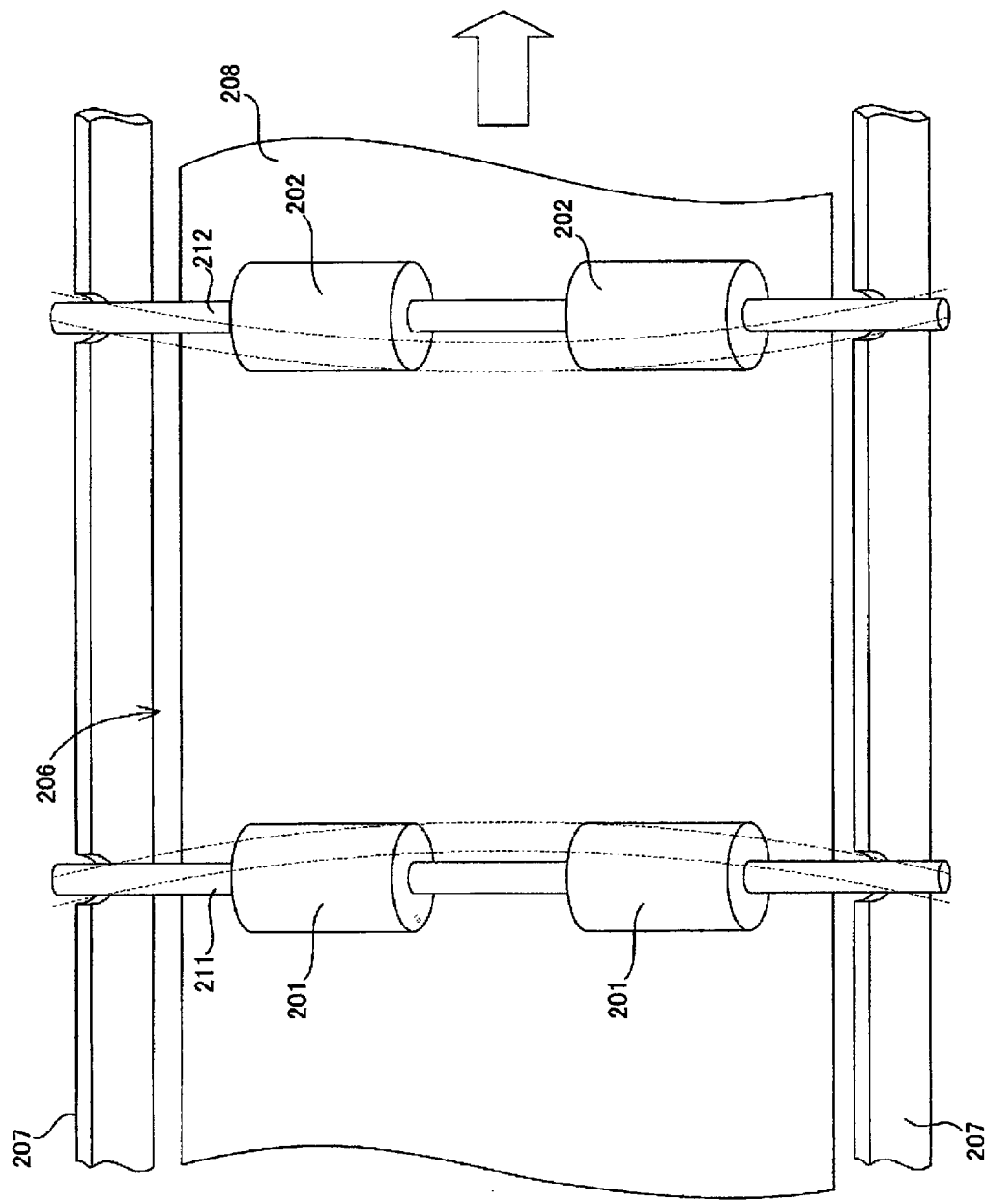
FIG. 15 is a schematic showing a known roller supporting mechanism.

Referring to FIG. 14, in another embodiment of the present invention, a restriction rib 170 may replace mechanisms 140 and 141. Restriction rib 170 may be disposed upstream of shaft 76 in the feeding direction, as indicated by an outline arrow in FIG. 14. Restriction rib 170 may support shaft 76 in the direction along feeding path 16. Similarly, another restriction rib 170 may replace supporting mechanisms 100 and 110 to support shaft 66. Restriction ribs 170 may reduce flexing of shaft 66 and 76 along feeding path 16.

While the invention has been described in connection with various exemplary structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. An image processing device comprising:
   a first feeding unit;
   a second feeding unit, wherein the first feeding unit is coupled to the second feeding unit via a sheet feeding path, and is configured to feed a sheet toward the second feeding unit in a sheet feeding direction via the sheet feeding path;

an image processing portion, wherein the first feeding unit is disposed in the sheet feeding path upstream of the image processing portion in the sheet feeding direction, and the first feeding unit comprises:
- a first shaft configured to rotate in the sheet feeding direction;
- a first drive roller coupled to the first shaft and configured to convey the sheet; and
- a first pressing member configured to apply a force to the first drive roller, wherein the second feeding unit is disposed in the sheet feeding path downstream of the image processing portion in the sheet feeding direction, and the first feeding unit and the second feeding unit are configured to simultaneously feed and hold the sheet, wherein the second feeding unit comprises:
- a second shaft configured to rotate in the feeding direction;
- a second drive roller coupled to the second shaft and configured to convey the sheet; and
- a second pressing member configured to apply a force to the second drive roller;
- a first supporting member which rotatably supports each of a first end portion of the first shaft and a second end portion of the first shaft;
- a second supporting member which rotatably supports each of a first end portion of the second shaft and a second end portion of the second shaft;
- a third supporting member which rotatably supports the first shaft, which is disposed upstream of the image processing portion, at least one portion which is different than each end portion of the first shaft, adjacent to the first drive roller; and
- a fourth supporting member which rotatably supports the second shaft, which is disposed downstream of the image processing portion, at least one portion which is different than each end portion of the second shaft, adjacent to the second drive roller.

2. The image processing device of claim 1, wherein a first circumferential velocity at which the first drive roller rotates is less than a second circumferential velocity at which the second drive roller rotates.

3. The image processing device of claim 1, wherein the at least one predetermined portion is associated with at least one of a length and a diameter of the at least one of the first shaft and the second shaft.

4. The image processing device of claim 1, wherein the third supporting member is disposed upstream of the second shaft in the sheet feeding direction.

5. The image processing device of claim 1, wherein the fourth supporting member comprises:
- a contact portion configured to contact a peripheral surface of the second shaft; and
- a fixing portion configured to be fixed to a case of the image processing device.

6. The image processing device of claim 5, wherein the fixing portion extends from the contact portion in a direction along the sheet feeding path.

7. The image processing device of claim 5, wherein the contact portion rotatably supports the at least one of the first shaft and the second shaft.

8. The image processing device of claim 1, wherein the first supporting member, the second supporting member, the third supporting member, and the fourth supporting member define a case of the image processing device and are disposed on a guide plate defining a guide surface of the sheet feeding path.

9. The image processing device of claim 1, further comprising an elastic member disposed on each of a surface of the first drive roller and a surface of the second drive roller.

10. The image processing device of claim 1, wherein the image processing portion is configured to read an image on the sheet fed from the first feeding unit to the second feeding unit in the sheet feeding path.

11. The image processing device of claim 1, wherein the image processing portion is configured to record an image on the sheet fed from the first feeding unit to the second feeding unit in the sheet feeding path.

12. The image processing device of claim 1, further comprising a pair of side frames, wherein the pair of side frames rotatably supports each of the first end portion of the first shaft and the second end portion of the first shaft as the first supporting member, and the pair of side frames rotatably supports each of the first end portion of the second shaft and the second end portion of the second shaft as the second supporting member.

13. The image processing device of claim 1, further comprising a guide configured to guide the sheet conveyed between the first feeding unit and the second feeding unit, wherein the fourth supporting member is mountable to the guide, between the first shaft and the second shaft.

14. A sheet feeding device comprising:
- a first feeding unit;
- a second feeding unit, wherein the first feeding unit is coupled to the second feeding unit via a sheet feeding path, and is configured to feed a sheet toward the second feeding unit in a sheet feeding direction via the sheet feeding path;
- a reference member comprising a reference surface which the sheet contacts during image processing wherein the first feeding unit is disposed in the sheet feeding path upstream of the reference member in the sheet feeding direction, and the first feeding unit comprises:
- a first shaft configured to rotate in the sheet feeding direction;
- a first drive roller coupled to the first shaft and configured to convey the sheet; and
- a first pressing member configured to apply a force to the first drive roller, wherein the second feeding unit is disposed in the sheet feeding path downstream of the reference member in the sheet feeding direction, and the first feeding unit and the second feeding unit are configured to feed and hold the sheet simultaneously, wherein the second feeding unit comprises:
- a second shaft configured to rotate in the feeding direction;
- a second drive roller coupled to the second shaft and configured to convey the sheet; and
- a second pressing member configured to apply a force to the second drive roller;
- a first supporting member which rotatably supports each of a first end portion of the first shaft and a second end portion of the first shaft;
- a second supporting member which rotatably supports each of a first end portion of the second shaft and a second end portion of the second shaft;
- a third supporting member which rotatably supports the first shaft, which is disposed upstream of the reference member, at least one portion which is different than each end portion of the first shaft, adjacent to the first drive roller; and a fourth supporting member which rotatably supports the second shaft, which is disposed downstream of the reference member, at least one portion which is different than each end portion of the second shaft, adjacent to the second drive roller.

15. The sheet feeding device of claim 14, wherein a first circumferential velocity at which the first drive roller rotates is less than a second circumferential velocity at which the second drive roller rotates.

16. The sheet feeding device of claim 14, further comprising a pair of side frames, wherein the pair of side frames rotatably supports each of the first end portion of the first shaft and the second end portion of the first shaft as the first supporting member, and the pair of side frames rotatably supports each of the first end portion of the second shaft and the second end portion of the second shaft as the second supporting member.

17. The sheet feeding device of claim 14, further comprising a guide configured to guide the sheet conveyed between the first feeding unit and the second feeding unit,
  wherein the fourth supporting member is mountable to the guide, between the first shaft and the second shaft.

* * * * *